United States Patent [19]

Weinstock et al.

[11] 4,314,871

[45] Feb. 9, 1982

[54] METHOD OF AND APPARATUS FOR LAMINATING TIMBER

[75] Inventors: Harry Weinstock, 302 La Contell, 50 Mitchell St., Berea, Johannesburg, 2198, South Africa; Harry L. Bregman, Johannesburg, South Africa

[73] Assignee: Harry Weinstock, Johannesburg, South Africa

[21] Appl. No.: 87,561

[22] Filed: Oct. 23, 1979

[30] Foreign Application Priority Data

Apr. 23, 1979 [ZA] South Africa ....................... 79/1914

[51] Int. Cl.³ ....................... B27G 11/00; B32B 31/12; B32B 31/20

[52] U.S. Cl. ............................... 156/258; 144/314 A; 144/317; 156/264; 156/266; 156/304.5; 156/304.1; 156/546; 156/555; 156/558; 156/559; 156/578; 156/580

[58] Field of Search ............... 156/304, 558, 559, 544, 156/555, 507, 264, 266, 269, 304.1, 304.5, 304.6, 312, 578, 258, 546, 580; 144/281 R, 281 B, 282, 309 Q, 314 A, 317

[56] References Cited

U.S. PATENT DOCUMENTS

| | | | |
|---|---|---|---|
| 2,486,213 | 10/1949 | Schulerud | 156/304.1 |
| 2,617,456 | 11/1952 | Winkel | 156/546 |
| 2,708,649 | 5/1955 | Cunningham | 156/272 |
| 2,729,584 | 1/1956 | Foster | 156/558 |
| 3,131,737 | 5/1964 | Pearl | 144/281 R |
| 3,388,020 | 6/1968 | Gates | 156/558 |
| 4,101,370 | 7/1978 | Russell | 156/555 |
| 4,123,315 | 10/1978 | Keller et al. | 144/317 |
| 4,128,119 | 12/1978 | Maier | 156/304 X |

FOREIGN PATENT DOCUMENTS 1302264 1/1973 United Kingdom .

*Primary Examiner*—Michael G. Wityshyn
*Attorney, Agent, or Firm*—Cushman, Darby & Cushman

[57] ABSTRACT

The invention relates to a method of and apparatus for laminating timber to form beams for use in structural and other uses. The beam is formed from timber strips forced through a set of pressure means comprising preferably pressure rollers in a side by side relationship with bonding medium applied to the vertical sides of the strips. These sides preferably have interengaging castellations formed thereon for improved connection between the strips. The strips are formed from timber lengths which are connected together preferably by finger jointing. The bonding medium is applied to the side faces of the timber lengths and to the ends at the same time. A braking system ensures that the ends of timber lengths are spaced well apart to enable adequate bonding medium to be applied to the timber length ends. The timber lengths are forced forwardly by an oscillating hydraulic cylinder acting through clamps to ensure that the ends of the timber lengths engage firmly and also to provide substantial forces for urging the strips through the pressure rolls.

11 Claims, 10 Drawing Figures

METHOD OF AND APPARATUS FOR LAMINATING TIMBER

Figure 1:
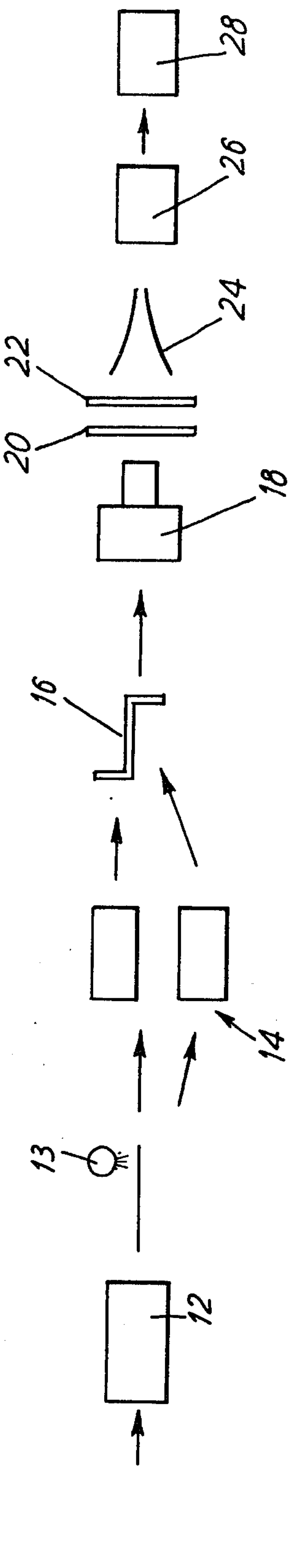

This invention relates to methods of and apparatus for laminating timber.

According to one aspect of the invention there is provided a method of laminating timber from a plurality of timber strips to form a beam wherein the contiguous faces of the timber strips are bonded together with bonding medium; the method comprising arranging the timber strips with the said contiguous faces vertical; applying bonding medium to the said faces; causing the timber strips to move through pressure means preferably a set of pressure rolls and maintaining the strips between pressure means for a period of time to facilitate the said bonding together of the faces.

The strips preferably move in a horizontal plane during passage through the pressure means. The timber strips are preferably pre-formed with interengaging square section teeth for example as described in the complete specification of South African Pat. No. 70/3762 (and corresponding British patent specification No. 1,302,264) (which specification is hereinafter called "the said specification"). In this case it will not be necessary to hold the strips together after they have passed through the rolls. If however the contiguous faces are plain or formed in any other way which does not have the the effect of holding the strips together then it may be necessary to provide clamp means preferably moving clamp means to hold the parts of the thus formed beam clamped together until the bonding medium has sufficiently set.

Preferably the method further comprises using a moving parting means to several lengths of the beam from that which is being formed and moving such parting means during severing in the same direction and at the same speed as the beam so that the forming operation can proceed continuously. The strips are preferably formed from lengths of timber which are bonded together, preferably by finger jointing, to form elongated timber strips. Preferably the said lengths of timber are advanced by oscillating means against a braking force so that the strips are forced hard up against one another in approaching the pressure rolls. Preferably the beam is moved through the pressure rolls very shortly after the finger jointing preferably in less than 1 minute, preferably less than ½ minute.

According to another aspect of the invention there is provided apparatus for forming a timber beam from a number of timber strips, the apparatus comprising guide path means guiding the strips with certain faces vertical, application means applying bonding medium to one or both of the said vertical faces of each strip, and pressure rollers rotatable about vertical axes which pressure rollers receive the strips from the guide means, cause the timber strips to move together and apply pressure to the strips and hold them under pressure to facilitate bonding together of the said faces. Preferably the guide path means are arranged in a substantially horizontal plane. Preferably there is provided timber parting means, preferably a flying saw, arranged to move relative to the rolls at the same speed as a beam passed there through so as to part lengths of laminated timber beam from the beam as it is being formed.

An embodiment of the invention will now be described by way of example with reference to the accompanying drawings.

Figure 2:
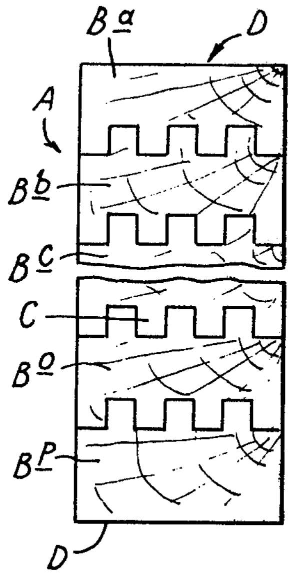
Figure 3:
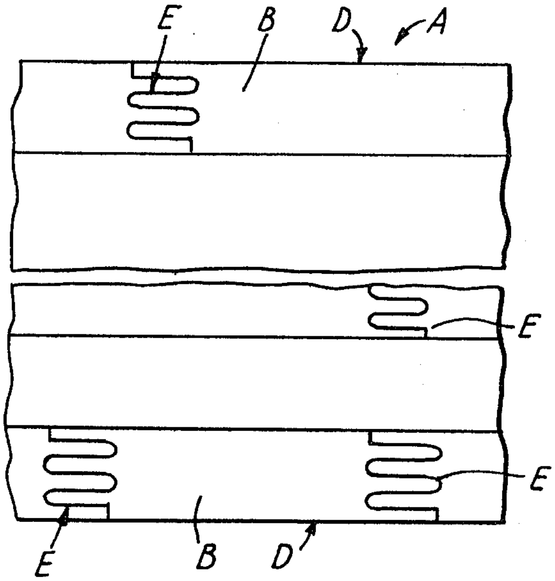
Figure 4:
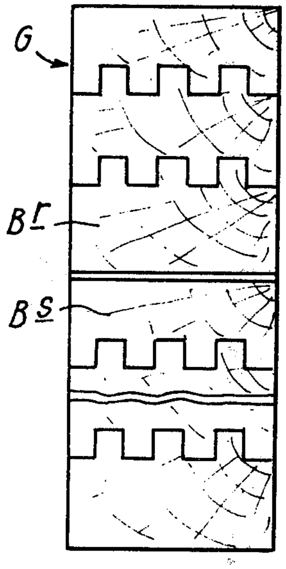
Figure 5:
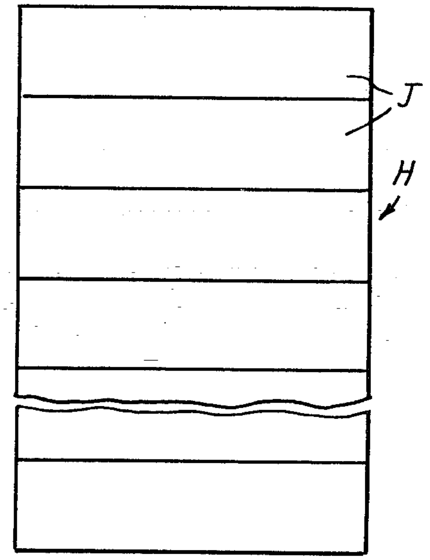
Figure 6:
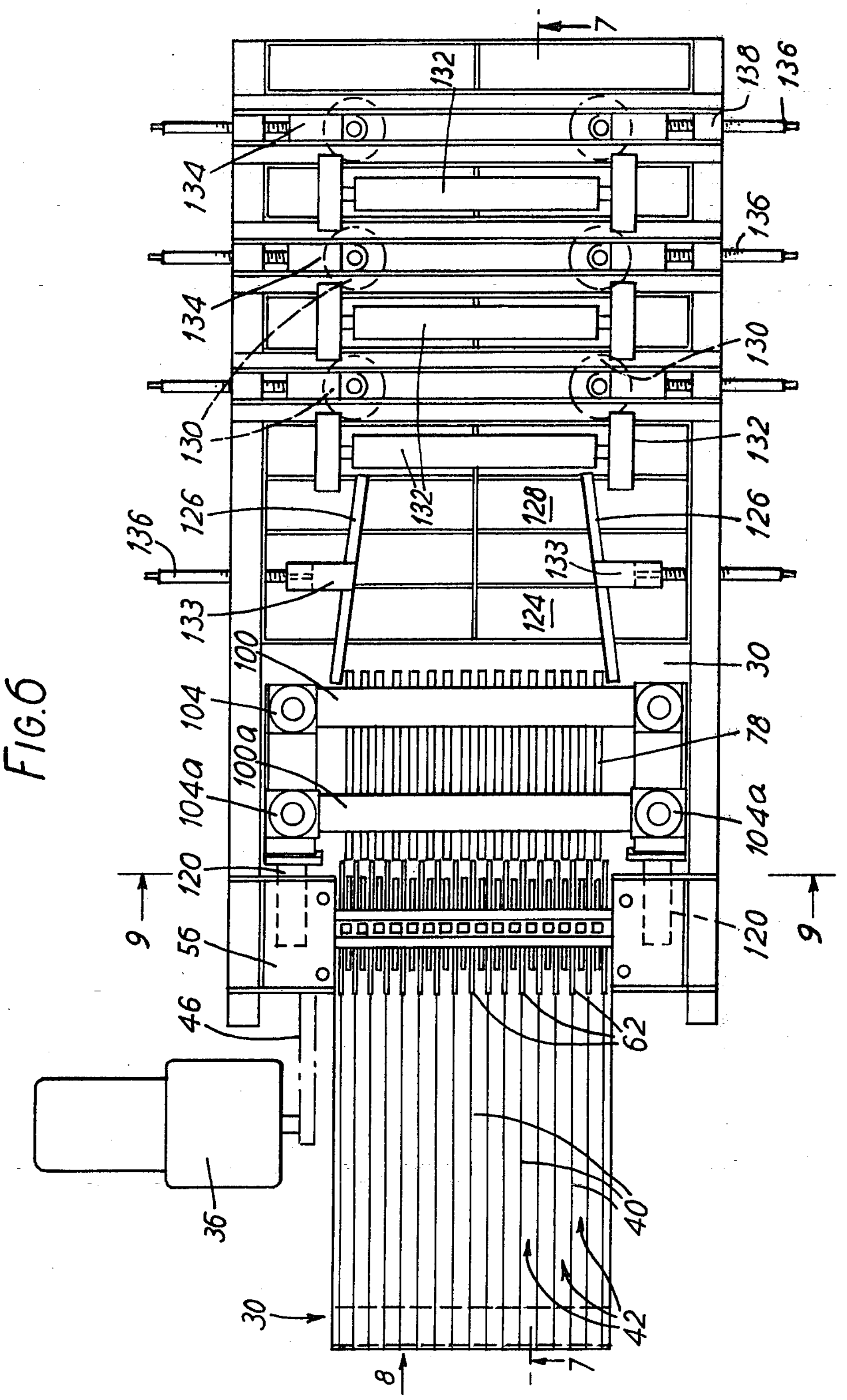
Figure 7:
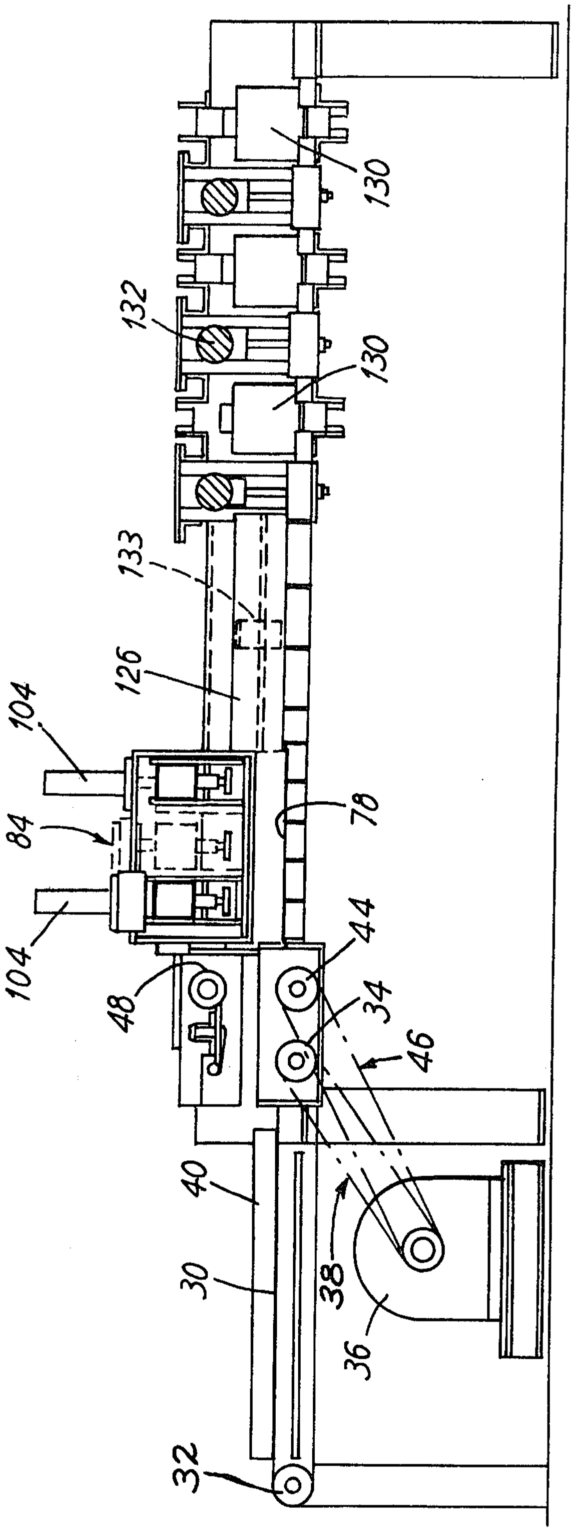
Figure 8:
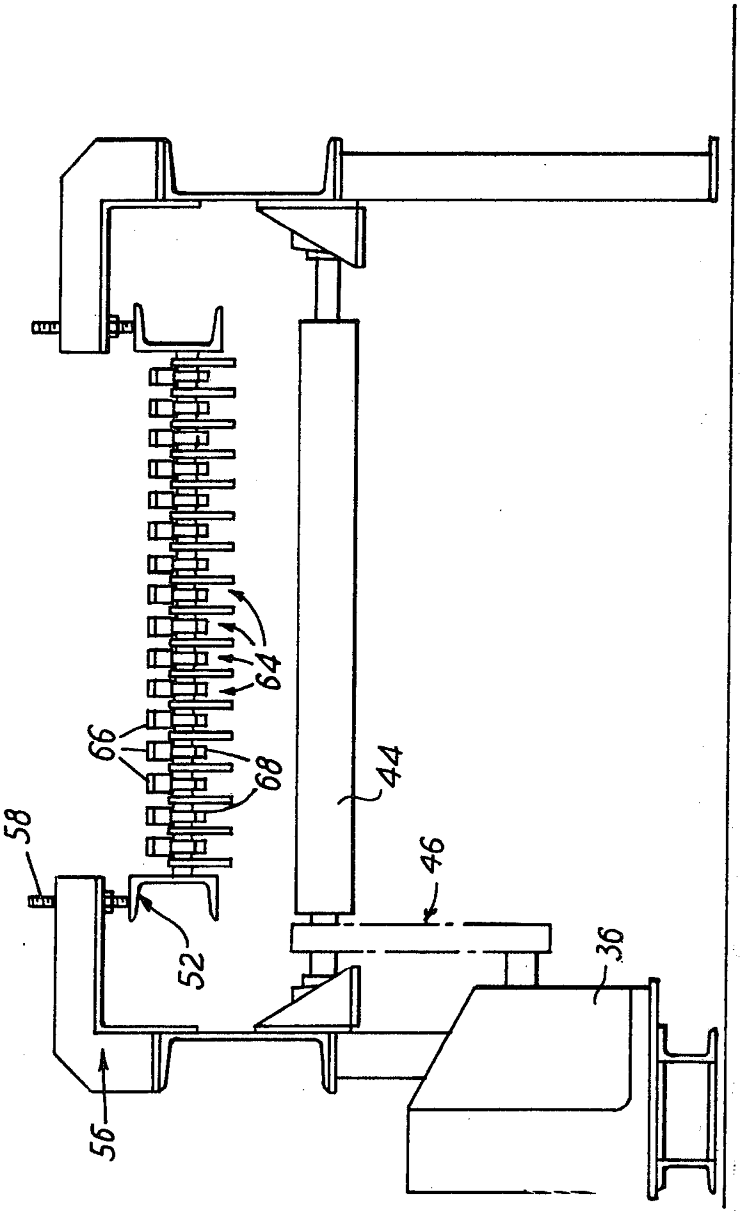
Figure 9:
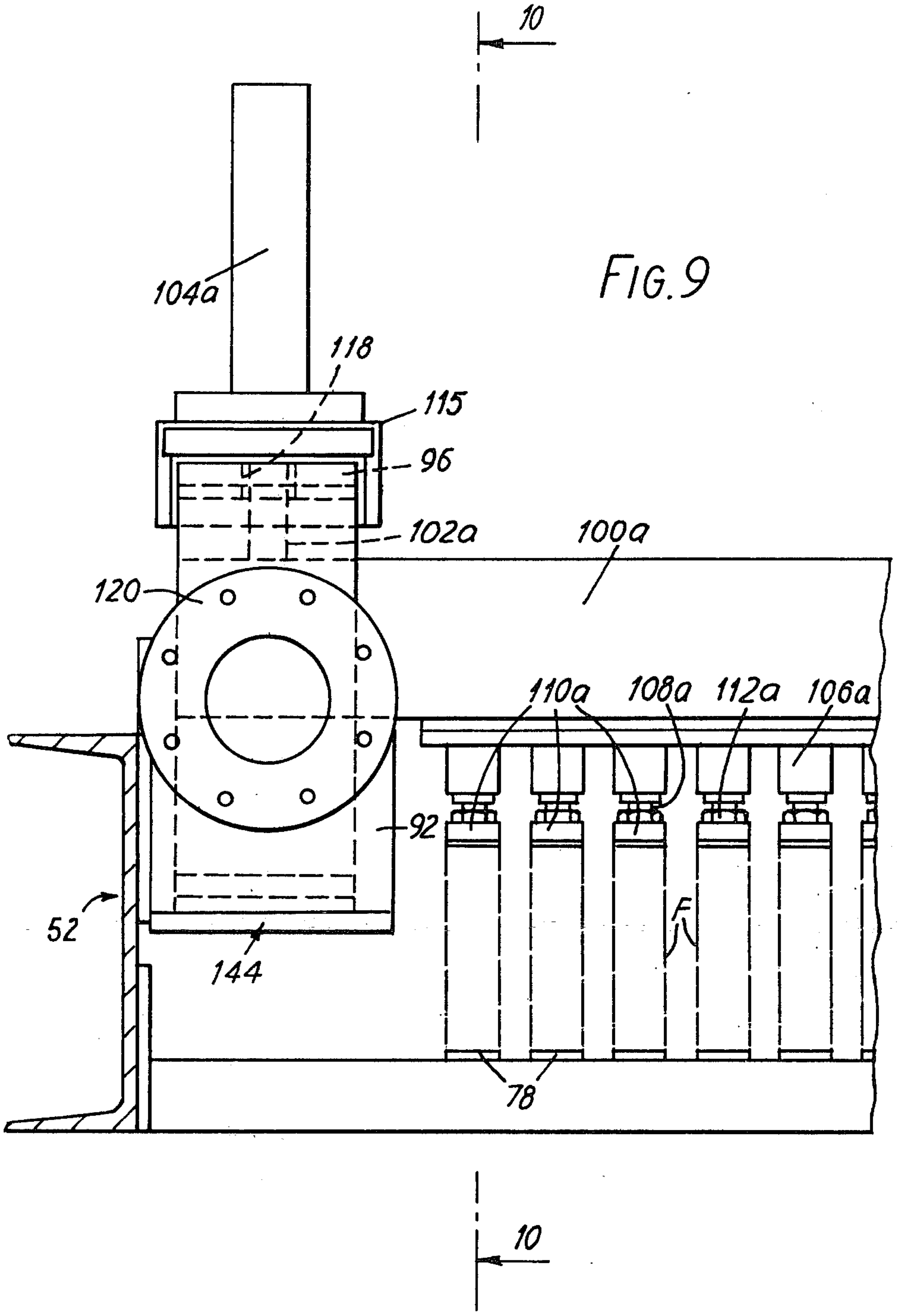
Figure 10:
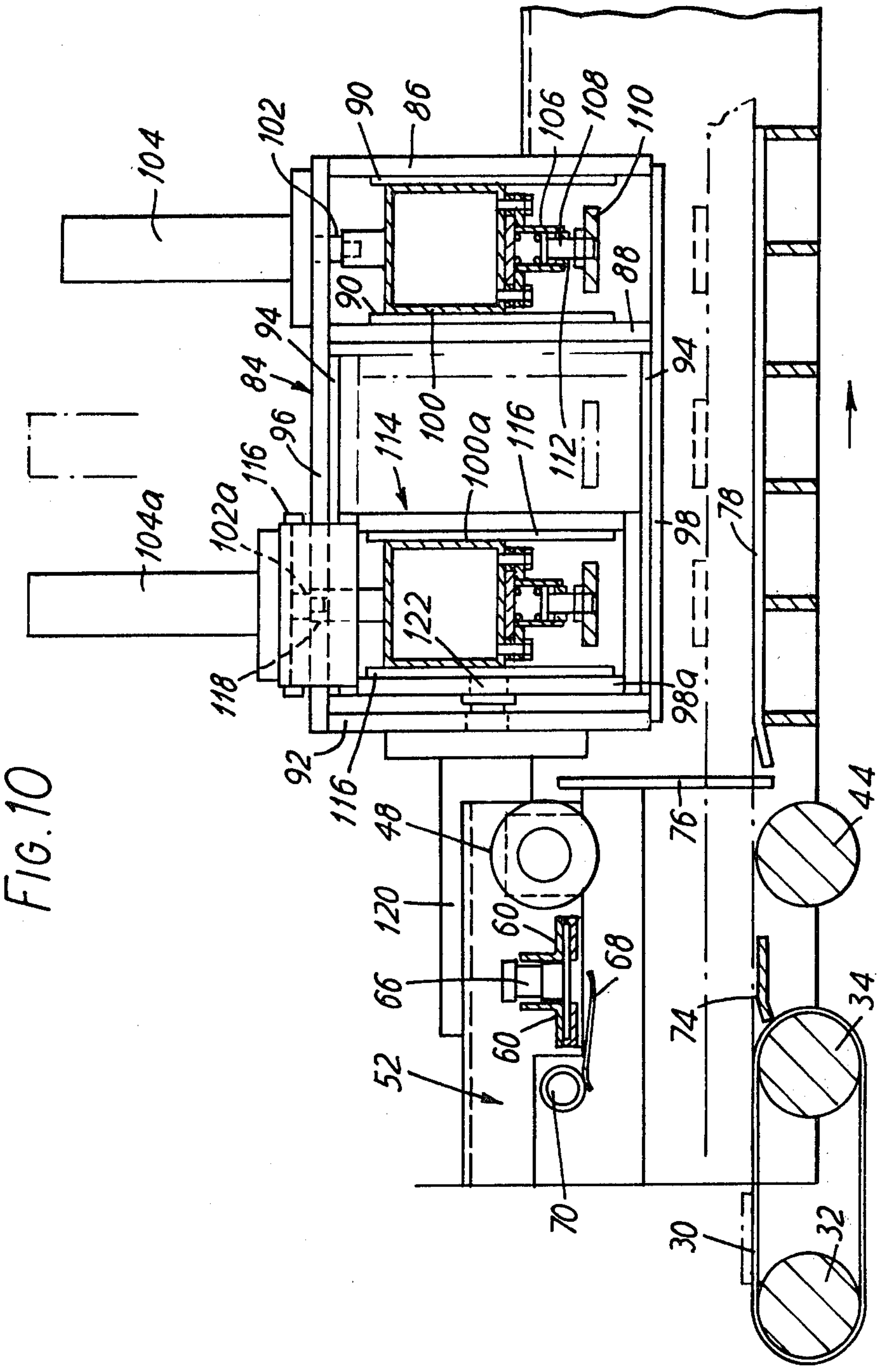

In the drawings:

FIG. 1 is a diagrammatic block diagram showing the process steps in the forming of a beam of timber by the method of the invention, FIG. 2 is an end view of one timber beam arrangement that is formed by the apparatus of the invention, FIG. 3 is a detail side view of the beam of FIG. 2, FIG. 4 is a view similar to FIG. 2 of a modified beam arrangement formed in the apparatus of the invention, FIG. 5 is a view similar to FIG. 2 of yet a further beam forward in the apparatus of the invention, FIG. 6 is a plan of apparatus of the invention, FIG. 7 is a section on line 7—7 of FIG. 6, FIG. 8 is an end view in the direction of arrow 8 of FIG. 6 with certain items in the background omitted for clarity, FIG. 9 is a detail section on line 9—9 of FIG. 6, the Figure being to a larger scale than FIG. 8, and FIG. 10 is a section on line 10—10 of FIG. 9.

The apparatus illustrated in FIGS. 6 to 10 is arranged to manufacture a beam arrangement as illustrated in FIGS. 2 and 3. This beam arrangement comprises a single beam A formed from sixteen timber strips Ba to Bp. The timber strips B are treated as described more fully in the said specification so that contiguous faces 5 are formed with closely fitting right angled castellations C, the outer faces D of the outer strips Ba and Bp being plane.

Each timber strip B is formed from short lengths of timber and ajacent lengths of timber F are connected together by finger joints E. Finger jointing is a method of jointing lengths of timber which is well known to those skilled in the art and is diagrammatically illustrated in FIG. 3. When arranging the lengths of timber (as will be described more fully herein) care is taken to ensure that the finger joints E are offset from one another so that possibility of weaknesses being formed by a number of aligned finger joints E is minimised or obviated.

The strips B may be formed of timber having different characteristics. Thus for example where the beam is intended to be used for construction purposes, the outer strips may comprise strong wood and alternate intermediate strips may comprise weak wood. Other arrangements of woods can be arrived at as desired but normally the outer strips will always comprise strong wood.

The manufacturing steps of the beam are indicated diagrammatically in FIG. 1. First the lengths of timber are taken to a planar at station 12 and are planed to the desired cross-section.

The timber lengths are then transported past a density measuring head at station 13 where they are tested for hardness, and then are divided at station 14 into strong and weaker timber portions. In station 14, the timber lengths are also marked with a suitable colour coding to indicate whether they are strongwood or weakwood and are formed with the castellated shape as described above and in the aforesaid specification. The timber lengths are then conveyed to a finger jointer at station 16 where the ends are provided with the appropriate finger jointing cuts.

At this juncture it is perhaps worth mentioning that the timber lengths can be shaped in one of three ways, viz: one side face plain and one with a male castellated formation (as strip Ba in FIG. 2), one side face plain and the other with a female castellated formation (as strip Bp in FIG. 2), and with one side face formed with a male castellated formation and the other side face formed with a female castellated formation (as all the other strips B in FIG. 2). To simplify the actions which the workers have to do, the timber lengths are further colour coded depending upon the shape into which they are cut. All the colour coding is preferably done on a particular surface of the timber lengths, preferably the upper surface of the timber lengths, preferably the upper surface, to indicate to the workers which is that face (i.e. the upper surface) of all the timber lengths.

The timber lengths which have been divided and formed are conveyed to a transfer station 18 thence a first drive station 20, a gluing station 22, a second drive station 24, a converging and pressure section 26 where the beam is formed and finally to a parting station 28 from which the parted beams are taken to storage where the bonding medium cures. The transfer station 18 is illustrated in FIGS. 6 and 7. It comprises a horizontal main conveyor belt 30 running over a pair of rollers 32 and 34. The belt 30 is long having an approximatey thirty meter run. A constant speed drive motor 36 drives the roller 34 through a chain and sprocket drive indicated generally at 38.

Above the main belt 30 are sixteen longitudinally extending pairs of sheet metal plates 40 which extend over the length of the belt to define paths 42 for timber strips moving along the belt 30. The paths 42 are about 20 mm apart.

The paths 42 are loaded manually with timber lengths. In order that the paths 42 are loaded with the correct timber lengths the timber is suitably colour coded and colour coding is applied to an indicator bar above the paths 42. The timber in the paths 42 is visually inspected along the length of the belt 30 to ensure that the correct timber lengths are in the appropriate paths and that the timber lengths are in their correct dispositions with the castellated sides vertical and facing the appropriate directions.

The belt 30 conveys the timber lengths F to the first drive station 20. The first drive station 20 comprises a transverse lower horizontal roller 44 located slightly below the level of the surface of the main belt 30 and spaced from the roller 34. This roller 44 is driven by the electric motor 36 through a chain and sprocket arrangement (indicated generally at 46 FIG. 7). An upper horizontal transverse roller 48 is located above the driven roller 44. This upper roller 48 is mounted on a sub-frame 52 formed of two outwardly directed longitudinally extending channel section members 54. The sub-frame 52 is mounted on the main frame 56 of the apparatus by means of bolts 58 arranged so that the height of the sub-frame 52 above the lower roller 44 can be adjusted to accommodate timber strips of different height.

The sub-frame 52 includes a pair of transverse members 60 which carry longitudinally extending guide plates 62 (best shown in FIG. 8) arranged to define pathways 64 aligned respectively with the paths 42 and adapted respectively to receive timber strips therefrom. Between the plates 62, the members 60 carry small brake cylinders 66 respectively for the paths. A leaf spring tube presser pad 68 rotatably carried on a common transverse horizontal shaft 70 is engaged by the piston rod 72 of each cylinder 66. A transverse guide plate 74 is located below the cylinders 66 and between the rollers 34 and 44. A timber strip F can be gripped between the associated presser pad 68 and the guide plate 74 for the purpose to be described below.

A limit switch is provided for each pathway 64. This limit switch is located close to the rollers 44 and 48. When the switch is released by a length of timber F emerging from the rolls 44 and 48, the switch actuates the lifting cylinder 66 to lower the pad 68. This applies a braking force to any timber strip in the path, which braking force is sufficient to stop any timber length reaching the rolls but is not sufficient to prevent the rolls advancing such timber already received between the rolls.

The first drive station 20 operates as follows: When a length of timer F in a pathway 64 leaves the belt 30 it enters into the nip between the rolls 44 and 48. It is then moved forwardly by these rolls 44 and 48. As soon as the timber length projects from the rolls it releases the limit switch so that the cylinder 66 is actuated to lower the preser pad 68. Thus a second length of timber being fed towards the rolls will be held between the presser pad 68 and plate 74 until the first timber length has been expelled and passes beyond the limit switch. The cylinder 66 now moves the presser pad 68 to an inoperative position and the second timber length will be moved by the main belt 30 into the nip between the rolls 14 and 48. The location of the limit switch is such that the rear end of the first timber length will be well clear of the front end of the second timber length when passing the gluing station 22.

If the timber length between the rolls 44 and 48 is sufficiently long for its rear portion to be gripped between the pad 68 and the plate 74, the friction between these parts will not be sufficient to prevent the rolls advancing the timber length F. The force exerted by the drive rolls 14 and 48 is not sufficient to drive a timber strip through the pressure rolls (to be described below).

The glueing station 22 is located just downstream of the drive rolls 44 and 48. It comprises fifteen standpipes 76 located between the pathways 64 followed by the timer lengths. Protectors (not shown) are provided upstream of the standpipes 76 to prevent the timber from inadvertently striking a standpipe. Each standpipe 76 is provided with a series of nozzles to be able to spray bonding medium (which includes accelerators) on to the vertical sides of the timber—as described above, the timber is fed into the paths 42 with the side (s) Fb have the castellated formation vertical. Further the nozzles will be so arranged that bonding medium will be sprayed on to the finger formations at the front and rear ends of the lengths of timber which as described above will be spaced from one another.

The second drive station 24 receives the timber strips F after the bonding medium has been applied to them. The station 20 comprises sixteen longitudinally extending narrow metal support strips 78 located to correspond to the pathways 64 respectively. The support strips 78 are narrower than the timber strips F which they carry. The support strips 78 are located above a trough (not shown). Any excess bonding medium on a timber strip F can thus run into a trough for recycling and further use.

A transverse overhead sub-assembly 82 is located above the support strips 78 being carried by box frames 84 at the side of the frame 56 of the apparatus.

Each box frame 84 comprises a pair of fixed spaced vertical plates 86 and 88 at its downstream portion. A pair of fixed vertical guides 90 are secured to the facing surfaces of the plates 86 and 88. Between the vertical end plate 92 at the upstream end of the frame 84 and the inner plate 88 at the other end, a pair of horizontal fixed guides 94 are provided on facing surfaces of the top and bottom plates 96 and 98 of the frame 84.

A transverse box section carrier member 100 is located between the vertical plates 86 and 88 and is guided for vertical movement relative thereto by the fixed vertical guides 90. The ends of the carrier member 100 are connected respectively to the piston rods 102 of two vertical hydraulic cylinders 104 arranged on the top plates 96 of the frames 84. Secured to the carrier member 100 on its underside are sixteen small cylindrical tubes 106 located respectively over the support strips 78. A carrier rod 108 is slidably carried in each tube 106 and carries a clamping foot 110. The rod 108 is spring biassed downwardly and an adjustable nut member 112 in the tube 106 limits the downward movement of the rod 108 and with it the clamping foot 110. The undersurface of the clamping foot 110 is slightly roughened to improve friction contact with a timber length.

A movable guiding box 114 is carried in each box frame 84 between the plates 88 and 92 and is guided for horizontal movement in the frame 84 by the horizontal guides 94. Each guiding box 114 has vertical guides 116 between which the ends of a carrier member 100*a* is vertically moveable. This carrier member 100*a* is identical with the carrier member 100. (The carrier member 100*a* will be hereinafter referred to as "the moving carrier member" and the carrier member 100 will be hereinafter referred to as "the fixed carrier member" and the various parts on or associated with the moving carrier member 100*a* will be given the same reference numbers as those of the fixed carrier member 100 but will be distinguished therefrom by the use of the suffix "a"). The guiding box 114 has a top plate 117 located above the top plate 96 and carrying the cylinder 104*a*. The top plate 96 of the frame 84 has a longitudinal slot 118 through which passes piston rod 102*a* of cylinder 104*a*.

A horizontal hydraulic pusher cylinder 120 is mounted on the end plate 92 of each frame 84 and its piston rod 122 passes through the plate 92 and is connected to the front wall 98*a* of the guiding box 114.

The second drive station 24 operates as follows: The rods 108 and 108*a* and the vertical cylinders 104 and 104*a* are adjusted for the height of the timber F being used. The moving carrier member 100*a* is in its rear position (i.e. nearest to the end plate 92). The cylinder 104 is caused to oscillate so that the fixed carrier member 100 and with it the clamping feet 110 are moved up and down.

When a timber length F passes under the vertical cylinder 104*a*, the cylinders 104*a* are actuated so that the moving carrier member 100*a* is moved downwardly so that the clamping feet 110*a* engage the timber length and grip it. The horizontal pusher cylinders 120 are now actuated and the guiding boxes 114 are moved forwardly (i.e. away from the end plate 92). This thus advances the timber lengths forwardly and it will be understood that this can be done with considerable force as may be determined by the power of the pusher cylinders 120. The clamping feet 110 will be engaging the timber intermittently during the forward movement thus applying a braking force to the timber. It should here perhaps be mentioned that the underside of the "moving" pressure feet 110*a* are rougher than that of the feet 110 so that there will be a greater forward force than the braking force. It will be noted that should there be separate timber lengths below the moving and fixed carrier members respectively, the forward end of the timber length being moved by the moving carrier member will be forced hard up against the rear end of the timber length being braked by the fixed carrier member 120. This will ensure that the corresponding finger jointing cuts on the ends will be forced hard into engagement to ensure that a sound finger joint will be made between them and thus the timber strips B will be formed.

The cylinders 120 are caused to reciprocate rapidly so that the beam moves intermittently but substantially continuously (except during cross-cutting operations as will be described below).

The timber strips are now conveyed to the pressure station 26, being moved thereto and therethrough by the cylinders 120 through the arrangement described in the preceding paragraph. The pressure station 26 includes a table 124 above which are a pair of plates 126 inclined to the direction of movement of the strips and forming a converging path 128.

The plates 126 act to move the strips together. Slightly downstream of the outlet from the path 128 and longitudinally spaced apart are three pairs of robust vertical idler side rollers 130. Horizontal idler pressure rollers 132 are provided between the vertical side rollers 130 and between the end of the path 128 and the first vertical roller 130.

The vertical pressure side rollers 130 and the guide plates 126 are respectively carried by carrier blocks 133 and 134 which in turn are engaged by screws 136. These screws 136 threadedly pass through nuts 138 on the frame by rotating the screws 136 the location of the rollers 130 and plates 126 can be adjusted for the width of the beam being made. Typically the distance between the rollers 130 may vary between 685 mm (maximum) to a minimum of 125 mm. Further the distance between the rollers may converge (e.g. by about 5 mm) downstream in the path of the beam.

The horizontal pressure rollers 182 are also mounted on carrier blocks 138 carried by screws 140 (see FIG. 7) rotatable in nuts 142. In this way the height of the rollers 132 can be varied.

The timber strips are moved through the pressure rollers by the horizontal pusher cylinder as described above. The vertical side pressure rollers 130 force the timber strips into intimate contact. The first causes the castellations to engage and then to home into one another and finally to force out any excess bonding medium. Furthermore the force of the side pressure rollers 130 will prevent any air bubbles forming between the timber strips. Such excess air will be forced out at the same time as any excess bonding medium and both will be forced out in a direction opposite to that in which the strips are moving. Such excess bonding medium will be collected in a sump (not shown) for recirculation.

The vertical side rollers 130 will retain the beam in the compressed condition for sufficient time to facilitate the bonding together of the timber strips. The horizontal rollers 132 will hold the timber strips firmly against the table 124 when these are being subjected to the compression forces of the vertical side rollers 130.

The final station of the beam laminating apparatus is the parting station 28 which is located at the discharge from the pressure rolls 130 and which, comprising parts well known to those skilled in this art, is not shown in detail. The parting station 28 comprises a beam receiving table to receive the beam from the rollers and a cross cut saw. When it is desired to cut a beam to length, the pusher jacks 120 are held against movement. The beam is now severed by the cross-saw; the severed beam removed; and the operation continued.

The operation of the apparatus 10 will be appreciated from the above description and it will be seen that a laminated beam of any desired length can be manufactured on this apparatus.

If it is desired to make a beam of narrower width then the timber strips are arranged as shown in FIG. 4. As can be seen intermediate the width of the total beam arrangement G there is provided a pair of end timber pieces Br and Bs arranged back to back. The gluing standpipe 76 which is located between the strips is rendered inoperative by closing the on/off valve. After the beam arrangement has been made as described above, then the two beams will just fall apart. It will thus be unnecessary to divide the beam portions by rip sawing as must be done at present with consequent waste of timber and cost of rip sawing.

The exact number of timber strips that constitute each of the members of each beam in any one beam arrangement can be changed as desired. A beam arrangement H as shown in FIG. 5 can also be laminated by the apparatus of the invention. The beam arrangement H therein shown comprises flat sides strips J. Because these strips J are not held together by the castellated formations as are the strips 12, it is necessary to provide suitable clamps for holding the strips together after emerging from the pressure rolls.

We have found that because most of the bonding medium is squeezed out from between the vertical faces of the timber strips, there will be only the desired thickness of bonding medium between the timber strips. This will minimise the time that the beams must spend in a curing chamber for the bonding medium to set. Indeed such curing is unnecessary for strips having castellated sides.

We have further found that as the bonding medium is applied to the vertical faces, any escaping bonding medium will tend to drop into the trough below strips 78 and there is very little or no soiling of any exposed face of the beam.

We have also found that the apparatus of the invention can be operated with far less workmen than conventional laminating apparatus currently known. Furthermore as beams of any desired length can be manufactured, wastage is minimised. In addition very short timber lengths may be used to form the strips which thus permits the use of otherwise unuseable timber.

It will be seen that the method and apparatus of the invention provides for the gluing of the side faces and the finger joints (or end faces when finger jointing is not required and e.g. butt jointing of the timber lengths is acceptable) in one operation. Furthermore substantially simultaneously the timber lengths will be joined together end to end to form the timber strips and lamination of the timber strips will take place in a manner which permits compliance with international specification. All this takes place in a single machine and virtually a single operation.

Furthermore we have found that due to the use of the castellations in arrangements as shown in FIGS. 2 and 4, clamping operations and curing of the bonding medium can be obviated.

The invention is not limited to the precise constructional details hereinbefore described and illustrated in the drawings. For example timber strips all of substantially the same length may be provided for forming beams of that length. These strips will be provided for forming beams of that length. These strips will be provided at the paths 42 for processing by the following steps as described above. This method of forming the beam is also a continuously operation with the strips moving continuously to and through the pressure rolls.

Instead of pressure rollers, other pressure means may be provided for forcing the timber strips together and holding them in this position. Typical other pressure means comprise belts, caterpillar tracks or jack operated clamping means.

Further instead of using the pusher arrangement apply intermittent substantially continuous force to the timber strips, a continuous drive may be applied e.g. by a pair of drive rollers. In this case the horizontal and/or vertical pressure rollers may also be driven to assist the movement of the beam through the pressure rollers.

More or indeed less than three vertical pressure rollers may be provided as desired. The pressure rollers may be arranged to form a parallel path as described above or may be arranged so that the distance between the rollers reduces to form a slightly converging throat. This convergence will normally be quite small of the order of about 5 mm between rollers. Some of the rollers may be located closer to each other as described above and some may be at a consistant distance apart so that the rollers define a throat which initially converges and is then of a consistant width.

It will also be understood that the apparatus may be designed to operate with as few as two timber strips which are laminated together although normally it would comprise more, usually at least five strips.

Instead of using a limit switch in each path 64, a light sensitive detector or indeed any other detector may be used.

The cylinders 104 and 120 may be pneumatic cylinders.

We claim:

1. A method of forming a beam from a plurality of short lengths of timber having pairs of opposite elongated side faces and smaller end faces; the method comprising:

(a) arranging the timber lengths in a number of rows with one pair of the said side faces vertical;

(b) feeding the rows of timber lengths to a bonding medium application station;

(c) spraying bonding medium onto the said vertical side faces of the timber lengths in such a manner that the bonding medium is also applied to the end faces of the timber lengths;

(d) forcing the end faces of the timber lengths in each row into engagement with one another so as to allow these faces to bond together thereby forming elongated timber strips from the timber lengths in the rows respectively;

(e) causing the timber strips to move together through pressure means, and (f) maintaining the strips between the said pressure means for a period of time to facilitate the bonding together of the contiguous side faces of the timber strips.

2. A method as claimed in claim 1 using timber strips having the said contiguous side faces formed in a way which does not have the effect of holding the said strips together, further comprising clamping the thus formed beam together after it has emerged from the pressure means and maintaining the beam clamped until the bonding medium has set.

3. A method as claimed in claim 1 further comprising collecting bonding medium which escapes from between the said vertical faces for re-use.

4. A method as claimed in claim 1 wherein said spraying step comprises spraying the bonding medium onto said vertical side faces substantially normal thereto so that the bonding medium thus sprayed will also be sprayed onto the said end faces.

5. A method as claimed in claim 1 or 4 further comprising forming the end faces with finger joints permitting adjacent end faces of adjacent timber lengths to interfit.

6. A method as claimed in claim 1 further comprising the step of arranging the said lengths of timber in such a way that said ends of timber lengths in adjacent rows are off-set from one another.

7. Apparatus for forming a timber beam from a number of short lengths of timber having opposite elongated side faces and smaller end faces, the apparatus comprising;

(a) guide path means guiding the timber lengths in rows with one pair of side faces vertical, (b) spray means for currently spraying bonding medium to said vertical side faces and end faces of each timber length, and (c) pressure rollers rotatable around vertical axes which pressure rollers (i) receive the strips from the guide means (ii) cause the timber strips to move together, and (iii) apply pressure to the strips and hold them under pressure to facilitate bonding together of said side and end faces.

8. Apparatus as claimed in claim 7 further comprising a trough located below the timber strips in the vicinity of the location in which the application means applies the bonding medium.

9. Apparatus as claimed in claim 8 further comprising recycling means feeding the bonding medium received in the trough to the application means.

10. Apparatus as claimed in claim 7 further comprising strip formation means that comprises:

(a) a first cross-member extending over the guide path means, (b) a plurality of pressure feet, one for each of said lengths of timber, the pressure feet being carried on said cross-member, (c) means for causing the pressure feet to move downwardly relative to the cross-member to apply pressure and for lifting the pressure feet, (d) a second cross-member, (e) a plurality of brake means carried by the second cross-member applying braking pressure to the timber lengths, and (f) moving means for reciprocating the first cross-member, the arrangement being such that the pressure feet will engage lengths of timber and will then be moved forwardly to advance the timber lengths against the retarding force of said brake means so that the ends of the timber lengths butt against each other to form the timber strips and are moved forward into the pressure rolls.

11. Apparatus as claimed in claim 10 in which the said brake means engage the timber lengths intermittently to apply the braking force.

* * * * *